PERIODIC-WAVE GENERATOR

Filed May 17, 1950 2 Sheets-Sheet 1

INVENTOR.
RINALDO E. DeCOLA
BY Laurence B. Dodds
ATTORNEY

Sept. 1, 1953 R. E. DE COLA 2,651,002

PERIODIC-WAVE GENERATOR

Filed May 17, 1950 2 Sheets-Sheet 2

INVENTOR.
RINALDO E. DeCOLA

BY Laurence B. Dodds

ATTORNEY

Patented Sept. 1, 1953 2,651,002

UNITED STATES PATENT OFFICE 2,651,002

PERIODIC-WAVE GENERATOR

Rinaldo E. De Cola, Park Ridge, Ill., assignor to Hazeltine Research, Inc., Chicago, Ill., a corporation of Illinois Application May 17, 1950, Serial No. 162,589

12 Claims. (Cl. 315—20)

*General*

Figure 1:
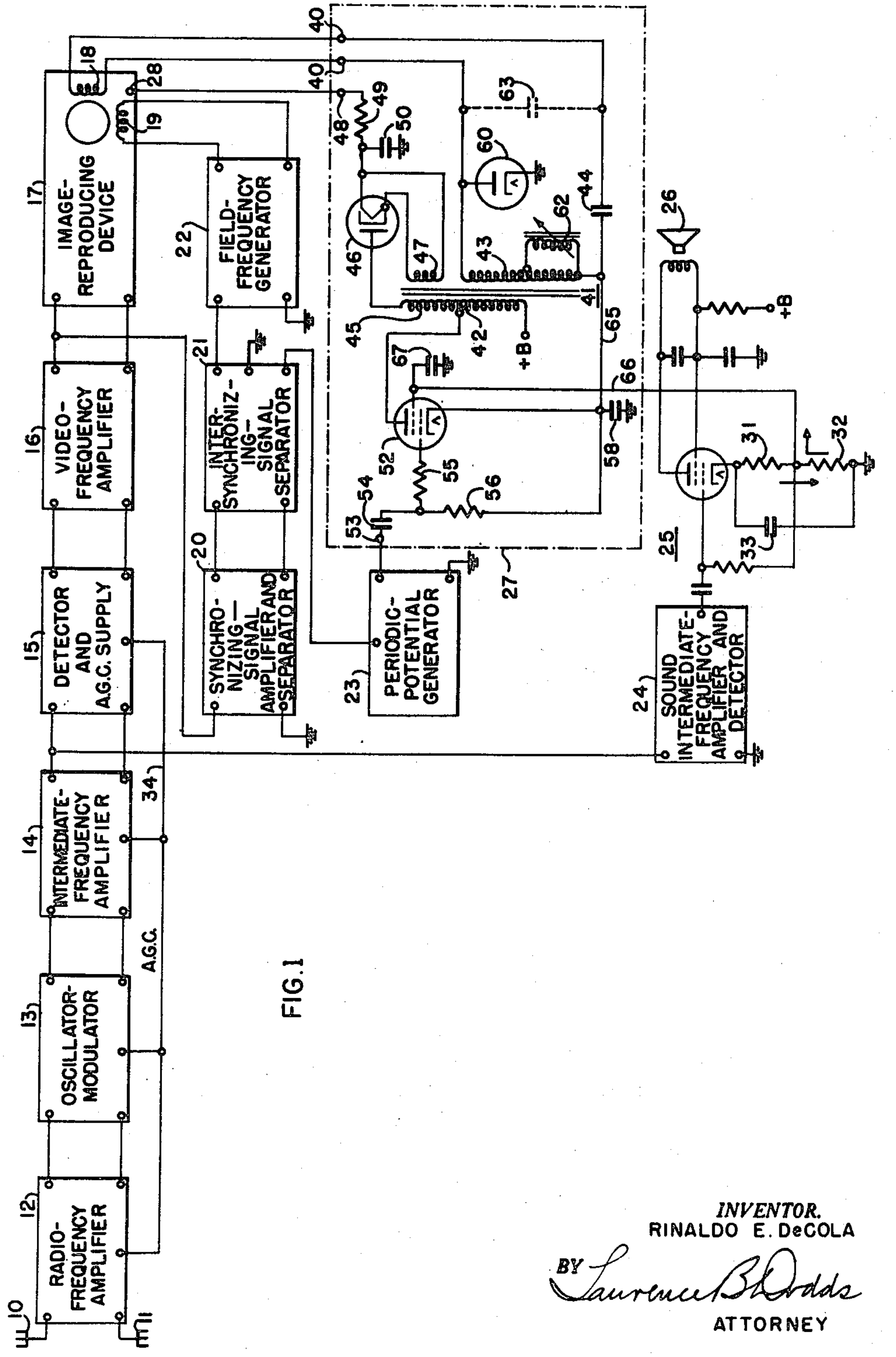

This invention relates to periodic-wave generators for supplying to an inductive load circuit a current of saw-tooth wave form having relatively long trace intervals and relatively short retrace intervals. While the invention is of general application, it has particular utility as a scanning-wave generator for a television receiver. The invention is especially useful in the line-frequency scanning circuit of a television receiver and, accordingly, will be described in that environment.

In a television receiver which utilizes magnetic deflection of the electron beam of the cathode-ray display tube thereof, it is customary to pass through the inductor comprising the line-scanning coil a current of saw-tooth wave form having relatively long trace intervals and relatively short retrace intervals. A generator which develops an approximately saw-tooth voltage wave is ordinarily employed to supply that wave to the input circuit of an amplifier which is capable of delivering relatively large amounts of energy to a load circuit which includes an output transformer and the line-scanning coil of the cathode-ray tube. The foregoing generator is usually referred to in the television art as a "driver stage" for the amplifier, the latter ordinarily being designated as the line-scanning amplifier. This amplifier customarily employs a screen-grid type of tube, such as a tetrode, because of its high mu and its large power-handling capability. The load circuit of the line-scanning amplifier is primarily inductive and includes the usual "efficiency" or "damping" diode for providing a path of reverse-current flow and for developing a potential to augment the unidirectional potential supplied from an independent space-current-source to the anode of the amplifier tube. Another unidirectional potential from a source independent of the potential developed by the efficiency diode associated with the amplifier load circuit is applied to the screen electrode. A second diode, which is coupled into the load circuit of the amplifier by the output transformer, is utilized in the well-known manner to derive a high unidirectional voltage for application to an anode of the cathode-ray tube.

Although line-frequency scanning circuits of the type just described have been very satisfactory and have been widely used in television receivers, they are subject to certain disadvantages presently to be mentioned. The occurrence of a short circuit in the above-mentioned output transformer or in the scanning yoke, or the complete or partial loss of the wave or signal supplied by the driver stage to the line-scanning amplifier results in the flow of excessive screen and anode current in the tube of the amplifier just mentioned. This large screen current ordinarily causes the destruction of the line-scanning amplifier tube and circuit components associated therewith. While this in itself is undesirable, a much more serious trouble may result, namely, a fire which is capable of doing extensive damage to the television receiver and possibly to the dwelling or establishment in which the receiver is operating.

Efforts heretofore have been made to reduce the likelihood of trouble of the type just mentioned by equipping television receivers with protective fuses. However, such efforts have been only partly effective, fires sometimes occurring as a result of failures of the type stated above even when the television receivers are provided with protective fuses.

The present trend in television receiver design tends to make the hazards stated above considerably greater than heretofore. At present, the manufacture of television receivers including cathode-ray tubes having large display surfaces and relatively short over-all lengths is becoming more widespread. In such receivers, it is necessary to deflect the electron beam of the cathode-ray tube over a wide angle to scan the display surface of such a tube, which angle may be as much as 70 degrees. Manifestly, the line-scanning amplifier is required to supply considerable amounts of power to the line-scanning coils of the cathode-ray tube in order to effect this wide angle scanning. It will be clear, therefore, that in the event of short circuits of the type mentioned above or the partial or complete loss of the drive wave or signal for the line-scanning amplifier, serious hazards may be created.

Thus, it would appear most desirable that the line-scanning circuits of a television receiver be self-protecting in the event of a failure of the type under consideration. Since the power-handling requirement of the line-scanning amplifier thereof is great, it would appear particularly attractive if that amplifier were able to afford its own protection when failure occurs in the circuits associated therewith.

It is an object of the invention, therefore, to provide a new and improved periodic-wave generator, for supplying to an inductive load circuit a current of saw-tooth wave form having relatively long trace intervals and relatively short retrace intervals, which generator avoids one or more of the above-mentioned disadvantages of prior deflection systems utilized with cathode-ray tubes.

It is another object of the invention to provide a new and improved periodic-wave generator, for supplying to an inductive load circuit a current of saw-tooth wave form having relatively long trace intervals and relatively short retrace intervals, which is self-protecting in the event of abnormal conditions affecting the operation thereof.

It is a further object of the invention to provide a new and improved periodic-wave generator which is particularly useful for supplying a current of saw-tooth wave form to the line-scanning coils associated with the cathode-ray tube of a television receiver.

It is a still further object of the invention to provide a periodic-wave generator of relatively high efficiency, for supplying a current of saw-tooth wave form to the scanning system of the television receiver, which generator is self-protecting in the event of abnormal conditions affecting the operation thereof.

It is an additional object of the invention to provide a new and improved periodic-wave generator which has a self-protecting feature and yet is relatively inexpensive to manufacture and to operate.

In accordance with a particular form of the invention, a periodic-wave generator comprises a load circuit including means for coupling an inductor thereto and constituting with that inductor, when operatively coupled thereto, primarily inductance. The generator also includes an electron-discharge device having input electrodes, output electrodes effectively coupled across the load circuit, and an electrode intermediate the output electrodes. The periodic-wave generator further includes means coupled to the input electrodes for applying thereto a periodic potential to develop a current of saw-tooth wave form in the inductor when it is coupled to the load circuit, and a first space-current supply means connected to one of the output electrodes for applying a predetermined potential thereto. The generator additionally includes a potential-supply system including at least a second space-current supply means conductively connected to the intermediate electrode and to another of the output electrodes and effectively isolated from the first supply means and responsive to the normal load current or voltage developed therein in response to the periodic potential for deriving and applying a control potential to the other output electrode to establish a potential difference between the other output electrode and the intermediate electrode, the aforesaid second supply means being effective to establish the major portion of the aforesaid potential difference but, in the absence of the aforesaid normal load current or potential therein, the control potential and the potential difference change to such values that space-current flow in the electron-discharge device is materially reduced.

For a better understanding of the present invention, together with other and further objects thereof, reference is had to the following description taken in connection with the accompanying drawings, and its scope will be pointed out in the appended claims.

Figure 3:
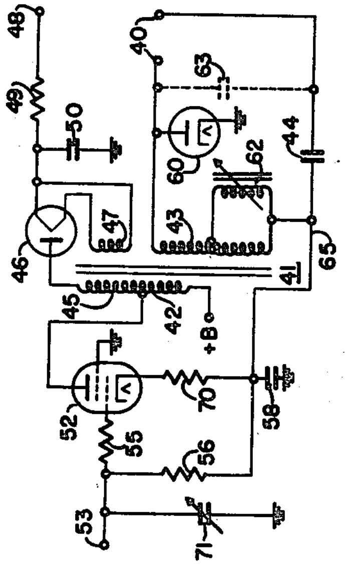
Figure 2:
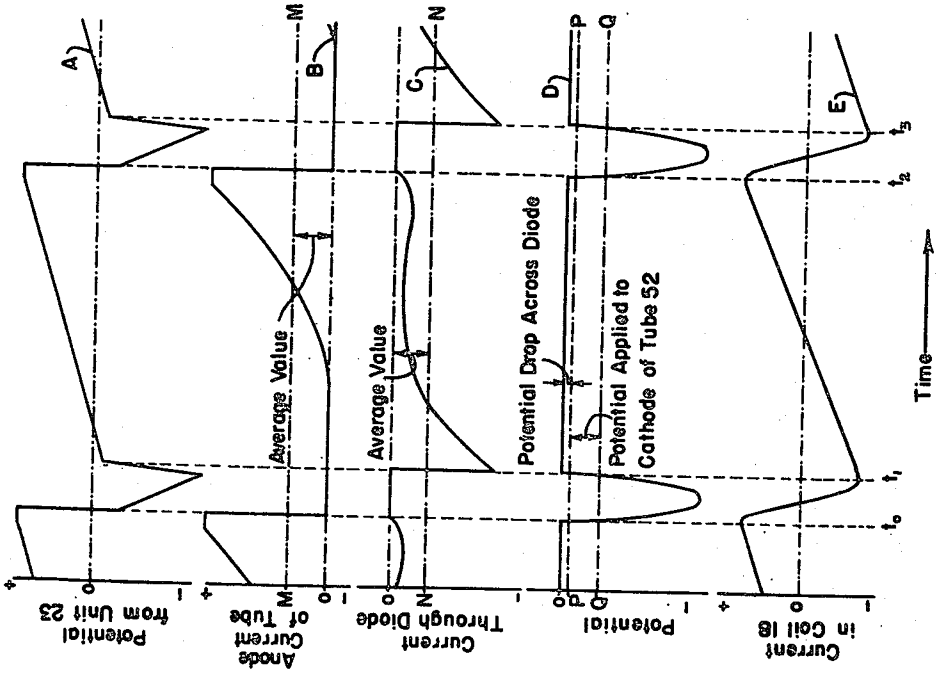

In the accompanying drawings, Fig. 1 is a circuit diagram, partly schematic, of a complete television receiver including a periodic-wave generator in accordance with a particular form of the present invention; Fig. 2 is a graph utilized in explaining the operation of the periodic-wave generator of the Fig. 1 receiver; and Fig. 3 is a circuit diagram of another form of the periodic-wave generator in accordance with the invention.

Referring now more particularly to Fig. 1 of the drawings, the television receiver there represented comprises a receiver of the superheterodyne type including an antenna system 10, 11 coupled to a radio-frequency amplifier 12 of one or more stages. There is coupled to the latter unit in cascade, in the order named, an oscillator-modulator 13, an intermediate-frequency amplifier 14 of one or more stages, a detector and automatic-gain-control or A. G. C. supply 15, a video-frequency amplifier 16 of one or more stages, and a cathode-ray tube image-reproducing device 17 of conventional construction provided with the usual line-frequency and field-frequency scanning coils 18 and 19, respectively, for deflecting the cathode-ray beam in two directions normal to each other. The A. G. C. supply circuit 15 is connected to the input circuits of one or more of these stages 12, 13 and 14 by a control-circuit conductor 34. Connected to the output terminals of the intermediate-frequency amplifier 14 is a conventional sound-reproducing system which comprises the usual sound intermediate-frequency amplifier and frequency detector 24, an audio-frequency amplifier 25, and a loudspeaker 26. The amplifier 25 is of conventional construction and includes in its cathode circuit an impedance network comprising resistors 31 and 32 which are serially connected between the cathode and ground, the resistors being shunted by a by-pass condenser 33. The resistors 31 and 32 are so proportioned that unidirectional potential of approximately 10–30 volts is developed at the junction of the two resistors.

The output circuit of the video-frequency amplifier 16 is coupled to the input circuit of a periodic-potential generator 23 and a field-frequency generator 22 through a synchronizing-signal amplifier and separator 20 and an inter-synchronizing-signal separator 21. The output circuit of the field-frequency generator 22 is coupled in a conventional manner to the field-scanning coil 19 of the image-reproducing device 17 while the output circuit of the periodic-potential generator 23 is coupled to the line-scanning coil 18 through a periodic-wave generator 27 in accordance with the present invention. The generator 27 effectively comprises the line-frequency generator for the television receiver. Anode excitation potential for the image-reproducing device 17 is supplied to a terminal 28 thereof from the periodic-wave generator 27. The units 10–27, inclusive, with the exception of the periodic-wave generator 27, which is constructed in accordance with the present invention and will be described in detail hereinafter, may be of conventional construction and operation so that a detailed description and explanation of the operation thereof are unnecessary herein.

Considering briefly, however, the general operation of the above-described receiver as a whole, television signals intercepted by the antenna system 10, 11 are selected and amplified in the radio-frequency amplifier 12 and are supplied to the oscillator-modulator 13, wherein they are converted into intermediate-frequency signals. The latter in turn are selectively amplified in the intermediate-frequency amplifier 14 and are delivered to the detector and automatic-gain-control supply 15. The modulation components of the signal are derived by the detector 15 and are supplied to the video-frequency amplifier 16 wherein they are amplified and then supplied to the input circuit of the image-reproducing device 17. A control voltage derived by the automatic-gain-control supply of unit 15 is applied as an automatic-amplification-control bias to the gain-control circuits of units 12, 13 and 14 to maintain the signal input to the detector of unit 15 within a relatively narrow range for a wide range of received signal intensities.

Unit 20 selects the synchronizing signals from the other modulation components of the composite video-frequency signal applied thereto from the video-frequency amplifier 16. The line-synchronizing and field-synchronizing signals derived by the separator 20 are separated from each other by unit 21 and are then supplied to respective ones of the generators 22 and 23 to synchronize the operation thereof. Unit 23 develops a substantially saw-tooth potential for application to the periodic-wave generator 27 to control the operation thereof. An electron beam is produced by the cathode-ray image-reproducing device 17 and the intensity of this beam is controlled in accordance with the video-frequency and control voltages impressed on the brilliancy-control electrode from the video-frequency amplifier 16. Saw-tooth current waves are generated in the line-frequency or periodic-wave generator 27 and also in the field-frequency generator 22 and are applied to the scanning coils of the unit 17 to produce scanning fields, thereby to deflect the cathode-ray beam of that unit in two directions normal to each other to trace a rectilinear scanning path on the screen of the tube and thereby reconstruct the translated picture.

The sound intermediate-frequency signal is amplified in unit 24 and the audio-frequency modulation components thereof are derived in a conventional manner by the frequency detector of that unit and are then applied to the audio-frequency amplifier 25 wherein they are amplified and applied to the loudspeaker 26 for conversion to sound.

*Description of periodic-wave generator of Fig. 1*

Referring now more particularly to the portion of the Fig. 1 receiver embodying the present invention, the periodic-wave generator 27 for supplying to an inductive load circuit a current of saw-tooth wave form having relatively long trace intervals and short retrace intervals comprises a load circuit. This load circuit includes a pair of terminals 40, 40 for coupling an inductor thereto, namely the line-scanning coil 18, and constitutes with that inductor, when the latter is operatively coupled thereto, primarily inductance. The load circuit also includes a transformer 41 having primary and secondary windings 42 and 43, respectively, the line-scanning coil 18 being coupled across the secondary winding through a coupling condenser 44. The transformer 41 is effective to convert the relatively small inductance of the scanning coil 18 to the larger inductance desired in the output circuit of the periodic-wave generator. The effective inductance of the load circuit is that of the transformer primary winding 42 as measured with the scanning coil 18 connected across the secondary winding 43.

The load circuit may also be considered to comprise a rectifier device, specifically a diode 46, for deriving a high unidirectional potential from the flow of rectified current therethrough. The unidirectional potential, as will be explained subsequently, is subject to variations with changes in operating conditions which affect the potential-supply system. The anode of the diode 46 is connected to one end of a step-up winding 45 of the transformer 41, the other end of that winding being connected to one end of the transformer primary winding 42. The transformer 41 also includes an auxiliary winding 47 for supplying heater current to the filament for the cathode of the diode 46. The cathode of the foregoing diode is connected through a conventional resistor-condenser filter network 49, 50 to a high-voltage output terminal 48 which in turn is connected to the high-voltage input terminal 28 of the image-reproducing device 17.

The periodic-wave generator also includes an electron-discharge device, preferably a high-mu electron tube such as a beam tetrode 52, having control electrode-cathode input electrodes, anode-cathode output electrodes coupled across the primary winding 42 and hence effectively across the load circuit, and a screen electrode intermediate the output electrodes. The generator further includes means comprising a terminal 53 for applying to the input electrodes of the tube 52 the periodic potential supplied by the periodic-potential generator 23 to develop a current of saw-tooth wave form in the line-scanning winding 18 when it is coupled as indicated to the load circuit of the tube just mentioned. The terminal 53 is coupled to the control electrode of tube 52 through a coupling condenser 54 and a voltage-dropping resistor 55. The junction of the condenser 54 and the resistor 55 is connected to the cathode of tube 52 through a grid-leak resistor 56. The cathode of the tube 52 is connected to ground through a condenser 58 having a relatively large capacitance.

The periodic-wave generator additionally includes a first space-current supply means comprising a source of unidirectional potential indicated as +B which is connected through the primary winding 42 to one of the output electrodes of the tube 52, specifically to the anode thereof, for applying a predetermined unidirectional potential to that anode. The generator also includes a potential-supply system including at least a second space-current supply means connected in circuit with the secondary winding 43 of the transformer 41 and the line-scanning coil 18. The aforesaid potential-supply system is responsive to the normal load current or voltage developed therein in response to the periodic potential applied to the unit 27 from the generator 23 for deriving and applying a control potential to another of the output electrodes, namely to the cathode of tube 52, and for establishing a potential difference between the cathode and the screen electrode of tube 52, the parameters of the system being so arranged and proportioned that the major portion of the aforesaid potential difference is established by the second supply means and that, in the absence of the aforesaid normal load current or potential, the control potential and the potential difference change to such values that the space-current flow in tube 52 is materially reduced. This second space-current supply means includes an electron-discharge means in the form of a rectifier device, such as a diode 60, which is responsive to the energy periodically stored in the coil 18 for usefully discharging that coil at the start of the trace intervals of the saw-tooth current wave developed in the inductor. The anode of the diode 60 is connected to one terminal of the winding 43 while the cathode thereof is grounded, thus permitting the use of an inexpensive tube because of the low heater-to-cathode voltage. The diode 60 serves the purpose of an efficiency or damping diode. This second space-current supply means also includes an adjustable inductor 62 ordinarily comprising the width control for the electron beam of the image-reproducing device 17. The inductor just mentioned is coupled across a portion of the secondary winding 43 of the transformer. The second space-current supply means further includes a condenser 63 which may be considered to be connected across the secondary winding 43, the condenser being shown in dotted lines for the reason that it may be comprised in whole or in part of the inherent capacitance of the load circuit. The condenser 63 and the windings associated therewith cause the second space-current supply means to be resonant at a frequency approximately five times that of the current of saw-tooth wave form developed in the line-scanning coil 18.

The potential-supply system additionally includes a control circuit for applying a control potential to the cathode effectively to bias the screen electrode of tube 52 in a predetermined or positive sense with reference to the cathode. In particular, the potential applied to the cathode of tube 52 is negative with reference to ground. This control circuit includes the condenser 58 and a conductor 65 which is connected between the cathode of the tube 52 and the junction of the secondary winding 43 and the condenser 44. In view of the fact that a positive potential from the first space-current source +B is connected to the anode of tube 52 and a derived negative potential is connected to the cathode of that tube, the two potentials just mentioned are effectively connected in series-aiding relationship across the output electrodes of the tube 52.

The potential-supply system includes means effectively coupled between the cathode of the tube 52 and the screen electrode thereof for reducing the extent of unidirectional variations of the described high-voltage supply system including the diode 46. More particularly, this means comprises a source of unidirectional potential having a value which is a small fraction of the control potential applied to the cathode of the tube from the second space-current supply means, and conveniently comprises the cathode resistor 32 of the audio-frequency amplifier 25 and also a conductor 66 which is connected between the high-potential terminal of the resistor 32 and the screen electrode of tube 52. The screen electrode of that tube is connected to ground through a by-pass condenser 67.

*Explanation of operation of periodic-wave generator of Fig. 1*

In considering the operation of the periodic-wave generator 27 of Fig. 1, reference is made to the curves of Fig. 2. Curve A represents the signal applied over a short period of time to the input circuit of the tube 52 from the periodic-potential generator 23. It will be seen that this periodic potential is of approximately saw-tooth wave form and has during the interval $t_0$—$t_1$, hereinafter referred to as the retrace interval, a negative pulse portion of a relatively large value. During the succeeding interval $t_1$—$t_2$, referred to as the trace interval, this potential increases substantially linearly to a relatively high positive value until time $t_2$ whereupon it changes abruptly to a relatively large negative value. At time $t_3$, which corresponds to the end of another large negative pulse portion, the periodic potential again commences to increase gradually to a positive value, thus forming a succeeding trace interval. It will be seen, therefore, that this periodic potential has the wave form of the usual signal applied by a multivibrator-type driver stage to the succeeding line-scanning amplifier of a television receiver. At time $t_0$, the tube 52 is biased to cutoff by the negative pulse portion of the potential of curve A and the tube remains nonconductive until such time as the periodic potential exceeds the threshold level of the tube 52, whereupon the anode current proceeds to increase approximately linearly as represented by curve B of Fig. 2. Just prior to time $t_2$, the anode current reaches its maximum value. However at time $t_2$ a large negative pulse portion of the potential represented by curve A is effective to bias the tube 52 once more to cutoff, thus causing the anode current thereof to fall to a zero value. Following the retrace interval $t_2$—$t_3$, the anode current increases in a manner represented by curve B. The average value of the anode current may be represented by the level signified by the horizontal line M—M.

The transformer 41 converts the anode-potential variations of the tube 52 appearing across the primary winding 42 to corresponding variations across the secondary winding 43 of the transformer. The potential developed across the secondary winding during the trace interval $t_1$—$t_2$ is applied to the diode 60 and causes it to conduct thereby developing diode current having the wave form represented by curve C of Fig. 2 and the average value designated by the level N—N. During the initial portion of the trace interval $t_1$—$t_2$, the diode 60 usefully discharges the energy stored in the coil 18 in the well-known manner. The second space-current supply means including this diode develops a unidirectional control potential, represented by curve D of Fig. 2, having large negative pulse portions during the retrace intervals $t_0$—$t_1$ and $t_2$—$t_3$. The potential drop across the diode 60 is represented by the level P—P. The pulsations in the derived negative potential are smoothed out by the action of the condenser 58 connected to the cathode of tube 52 so that the negative unidirectional potential applied to the cathode of that tube has an average value which may be represented by the level Q—Q during normal operation of the television receiver and hence of the periodic-wave generator 27. A small positive unidirectional potential having a value of approximately 10–30 volts which is developed across the cathode resistor 32 of the audio-frequency amplifier 25 is applied by the conductor 66 to the screen electrode of the tube 52. The output circuit of the tube 52 applies by way of the secondary winding 43 and the coupling condenser 44 a current of saw-tooth wave form to the line-scanning coil 18 of the image-reproducing device. This current is represented by curve E of Fig. 2 and has the usual short retrace intervals and relatively long trace intervals as represented by the curve during the representative intervals $t_0$—$t_1$ and $t_1$—$t_2$.

During each retrace interval of the developed saw-tooth current, that portion of the load circuit for the tube 52 comprising the transformer secondary winding 43, the condenser 63, and the line-scanning coil 18, which were previously indicated as being resonant at a frequency approximately five times the line-scanning frequency, are shock-excited, thereby promoting the establishment of a rapid retrace interval for the current wave represented by curve E of Fig. 2. Transient oscillations beyond the first half cycle of shock excitation are undesirable in the circuit just described since they affect the linearity of each trace portion of the current wave. The diode 60 is rendered conductive during each trace interval and damps those undesired oscillations beyond the first half cycle. From this standpoint, the diode 60 may appropriately be considered as a damping diode. The collapsing magnetic field in the portion of the load circuit just described produces a positive-potential pulse across the primary winding 42 of the transformer 41. This pulse is stepped-up to a very high potential by the winding 45 and is delivered to the diode 46 which rectifies that pulse. The described operation repeats itself for succeeding pulsations and the rectified pulses derived by the diode 46, after being smoothed by the filter network 49, 50, are delivered as a high unidirectional potential to the terminal 28 for application to an anode of the image-reproducing device 17. From the foregoing explanation it will be seen that the high potential applied to the device 17 is developed in a manner which is well known in connection with high-voltage television power-supply systems of the so-called "kick back" type.

It will be clear that since the potential developed by the circuit associated with the diode 60 is applied by the conductor 65 to the cathode of the tube 52 with negative polarity, the aforesaid negative potential applied to the cathode and the positive potential applied to the anode by the source +B are effectively in series-aiding relationship across the output electrodes of the tube. The energy derived from the second space-current supply means including diode 60 is, therefore, effective to increase the amplitude of the saw-tooth current wave applied to the line-scanning coil 18 over what it would be without the aforesaid supply means without the increasing power consumption. Hence, the diode 60 truly constitutes an efficiency diode.

In the event of a short circuit occurring in the line-scanning coil 18, the diode 60 also effectively becomes short-circuited so that it is incapable of developing a negative control potential for application by the conductor 65 to the cathode of the tube 52. Accordingly, the screen electrode-to-cathode potential of the tube 52 falls to a low value equal to the small positive potential developed across the resistor 32 of the audio-frequency amplifier 25. Since the screen potential of a tetrode, such as the tube 52, primarily controls the space-current flow therein, the low screen potential of that tube permits only a small safe space-current flow therein under the condition just mentioned. The magnitude of this current flow is sufficiently small that the tube and its associated electrical components are not injured thereby. A similar action also takes place when a failure or short circuit occurs in the windings of the transformer 41 and in the high-voltage supply system.

The complete or partial loss of potential supplied by the periodic-potential generator to the input circuit of the tube 52 results in a decreased potential developed across the primary winding 42 of the transformer 41. This in turn results in a corresponding decrease or absence of potential across the secondary winding 43, thus correspondingly affecting the magnitude of the negative unidirectional potential developed by the second space-current source including the diode 60 for application by the conductor 65 to the cathode of the tube 52. This in turn reduces to a safe value the magnitude of the potential applied between the screen and cathode electrodes of the tube 52, thereby maintaining the current flow therein at a safe value. Thus, it will be seen that the described potential-supply system including the second space-current supply means, in the absence of normal load current or potential in the load circuit of the tube 52, is effective to cause the control potential applied to the cathode of the tube and hence the bias applied to the screen electrode thereof to change to such a value that the space-current flow in that tube is materially reduced. More particularly, the negative control potential applied to the cathode of tube 52 and hence the positive bias applied to the screen electrode thereof diminish to such a small value that the value of the aforesaid space current is materially reduced.

In the event the high-voltage power-supply system including the diode 46 becomes overloaded for any reason, this overload condition of that system reacts on the various circuits coupled to the transformer 41 and causes a material reduction of the screen electrode-to-cathode potential. This in turn causes a reduction in magnitude of the scanning current applied to the line-scanning winding 18 and soon the effects are cumulative and cause the operation of the periodic-wave generator 27 to collapse.

The small positive unidirectional potential developed across the cathode resistor 32 of the audio-frequency amplifier 25 for application to the screen electrode of the tube 52 provides a sufficient positive potential between the screen and cathode electrodes to assure space-current flow in the tube when the television receiver and hence the generator 27 thereof is first placed in operation as by turning on the usual control switch (not shown). In other words, this small positive potential ensures that the periodic-wave generator 27 will be self-starting. The small positive potential applied by the resistor 32 and the conductor 66 to the screen electrode of the tube 52 provides another important benefit. During the operation of the television receiver of Fig. 1, the current flow in the resistor 32 contributed by the audio-frequency amplifier 25 is in the direction indicated by the left-hand arrow adjacent the resistor 32. The current flow in the resistor 32 due to the application of the negative unidirectional control potential to the cathode of the tube 52 is in the direction indicated by the right-hand arrow adjacent the resistor. The net current flow is, therefore, the difference between the larger current flow contributed by the audio-frequency amplifier and the smaller current flow contributed by the second space-current source connected to the cathode of the tube 52. Variations in the intensity of the electron beam of the image-reproducing device 17 caused, for example, by adjustment of the brightness control (not shown) of the television receiver produce variations in the second anode potential of the device 17. For example, an increase in the brightness of the reproduced image produced by unit 17 ordinarily causes the second anode potential to decrease in magnitude.

The additional load imposed upon the high-voltage rectifier 46 causes the anode potential of the tube 52 to decrease. This in turn reduces the potential developed across both the primary and secondary windings 42 and 43, respectively, of the transformer 41 and consequently reduces the magnitude of the negative potential applied to the cathode of the tube 52. Accordingly, the potential across the resistor 32 contributed by the screen electrode-to-cathode circuit of tube 52 decreases. Since the previously mentioned currents flow through the resistor 32 in opposite directions, the net result of the decrease in the second anode potential is a slight increase in potential between the junction of the resistors 31 and 32 and ground. This slight increase in potential is translated by the conductor 66 to the screen electrode of tube 52 and increases the space-current flow in that tube. This in turn tends to raise the potential applied to the high-voltage diode rectifier 46 and thus tends to reduce the extent of unidirectional potential variations of the high-voltage supply system. Conversely, when the high-voltage unidirectional potential derived by the diode 46 increases in value due to operating conditions within the television receiver, the resistor 32 and the composite current flow therethrough is effective to develop a similar control action with reference to the screen electrode-cathode circuit of the tube 52.

The following circuit constants are given as illustrative values of circuit elements which may be utilized in the periodic-wave generator 27 of Fig. 1:

| | |
|---|---|
| Tube 46 | Type 1X2 |
| Tube 52 | Type 6BQ6 |
| Tube 60 | Type 6W4 |
| Resistor 32 | 1.5 kilohms |
| Resistor 55 | 220 ohms |
| Resistor 56 | 470 kilohms |
| Condenser 44 | 0.5 microfarad |
| Condenser 53 | 1000 micromicrofarads |
| Condenser 58 | 10 microfarads |
| Condenser 63 | About 100 micromicrofarads |
| Transformer 41 | Electrometric Co., Model No. C-12M-18689.2 |
| Winding 42 | 780 turns |
| Winding 43 | 292 turns |
| Winding 45 | 1142 turns |
| Inductance of coil 18 | 8 millihenries |
| +B | 360 volts |
| Potential across resistor 32 | About 15 volts |
| Cathode voltage-tube 52 | About 110 volts negative |
| Input voltage to tube 52 | 84 volts peak-to-peak |
| High voltage to terminal 48 | About 11,000 volts |
| Line-scanning frequency | 15,750 cycles/second |

The following tabulation indicates the magnitude of the cathode current for tube 52 under the short-circuit conditions listed below:

| Condition | Cathode Current, milliamperes |
|---|---|
| Terminal 48 grounded | 50 |
| Transformer 41 terminals grounded | 15 |
| Control electrode of tube 52 grounded | 15 |
| Control electrode of tube 52 connected to cathode | 35 |
| Generator 23 inoperative | 32 |

In a conventional unit corresponding to generator 27 the cathode current of the tube 52 is in excess of 150 milliamperes. Thus, it will be apparent from the foregoing data that the cathode current of tube 52 of a unit 18 in accordance with the invention is never excessive. From the foregoing information, it will be clear that the parameters of the potential-supply system are so arranged and proportioned that the major portion of the aforesaid potential difference is established by the second supply means and that, in the absence of the aforesaid normal load current or potential, the control potential and the potential difference change to such values that the space-current flow in tube 52 is materially reduced.

*Description of Fig. 3 Generator*

Referring now to Fig. 3 of the drawings, there is represented schematically a modified form of a periodic-wave generator in accordance with the present invention. This generator is very similar to the generator 27 of Fig. 1, hence corresponding elements thereof are designated by the same reference numerals. It will be seen that the generator of Fig. 3 differs primarily from the unit 27 of Fig. 1 in that the screen electrode of the tube 52 is connected directly to ground. Also, a resistor 70 may be coupled between the cathode of tube 52 and the ungrounded terminal of the condenser 58. Also, an adjustable condenser 71 is preferably employed between the input terminal 53 of the generator and ground.

*Operation of Fig. 3 Generator*

The operation of the periodic-wave generator of Fig. 3 is essentially the same as that of the corresponding Fig. 1 unit. Accordingly, only the pertinent differences will be mentioned. Since the screen electrode of the tube 52 is grounded, the second space-current supply means including the efficiency diode 60 develops for application by way of the conductor 65 and the resistor 70 to the cathode of the tube 52 a control potential which is negative with respect to ground. Accordingly, the screen electrode is effectively maintained at a potential which is positive with reference to the cathode. In the event of an abnormal operating condition, such as a short circuit of the type mentioned above or the loss of drive potential applied to the input terminal 53 by the generator 23, the flow of space current in the tube 52 is cut off since the screen electrode-to-cathode potential of the tube effectively falls to zero. Also, the operation of the periodic-wave generator of Fig. 3 is such that the voltage regulation of the high-frequency supply system including the diode 46 is satisfactory. Even though the screen electrode of the tube 52 is connected to ground, the device is self-starting. While the exact nature of the self-starting phenomenon of this generator is not clearly understood, it is believed that the relatively large peak-to-peak value of the periodic potential applied to the terminal 53 of the generator causes the flow of control-electrode current. Some of the electrons emitted by the cathode are believed to travel beyond the control electrode and impinge upon the anode of the tube 52. These electrons reaching the anode induce voltages in the primary and secondary windings of the transformer 41. The voltage developed across the secondary winding 43 is rectified by the diode 60 and a small unidirectional potential of negative polarity is then applied to the cathode by the conductor 65 and the resistor 70. In effect, therefore, a slight positive potential is applied to the screen electrode of the tube 52. The action thus referred to is regenerative and very quickly normal operating potential is developed for application to the screen electrode of the tube and the periodic-wave generator continues to operate in the normal manner. Otherwise the operation of the generator of Fig. 3 is substantially identical with that of the corresponding unit of Fig. 1.

While applicant does not wish to be limited to any particular set of circuit constants, the following circuit constants have proved to be useful in a periodic-potential generator as represented in the circuit diagram of Fig. 3 of the drawings:

| | |
|---|---|
| Tube 46 | Type 1X2 |
| Tube 52 | Type 6BQ5 |
| Tube 60 | Type 6W4 |
| Resistor 55 | 100 ohms |
| Resistor 56 | 470 kilohms |
| Resistor 70 | 68 ohms |
| Condenser 44 | 0.25 microfarad |
| Condenser 58 | 10 microfarads |
| Condenser 63 | About 100 micromicrofarads |
| Condenser 71 | 300 micromicrofarads (max.) |
| Transformer 41 | Electrometric Co., Model No. S-12-15 |
| Winding 42 | 842 turns |
| Winding 43 | 368 turns |
| Winding 45 | 842 turns |
| Inductance of coil 18 | 8 millihenries |
| +B | 360 volts |
| Cathode voltage of tube 52 | About 115 volts negative |
| Input voltage to tube 52 | About 84 volts peak-to-peak |
| High voltage to terminal 48 | About 9,500 volts |
| Line-scanning frequency | 15,750 cycles/second |

While the invention has been described in connection with the line-scanning circuit of a television receiver, it will be understood that the circuit of the field-frequency generator 22 of the Fig. 1 receiver may also incorporate a periodic-wave generator in accordance with the invention.

From the foregoing description, it will be clear that a periodic-potential generator in accordance with the present invention is self-protecting in the event of abnormal conditions such as the partial or complete loss of drive potential therefor or in the event of short circuits occurring in the transformer windings and the scanning yoke associated therewith.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A periodic-wave generator comprising: a load circuit including means for coupling an inductor thereto and constituting with that inductor, when operatively coupled thereto, primarily inductance; an electron-discharge device having input electrodes, output electrodes effectively coupled across said load circuit, and an electrode intermediate said output electrodes; means coupling to said input electrodes for applying thereto a periodic potential to develop a current of saw-tooth wave form in the inductor when it is coupled to said load circuit; a first space-current supply means connected to one of said output electrodes for applying a predetermined potential thereto; and a potential-supply system including at least a second space-current supply means conductively connected to said intermediate electrode and to another of said output electrodes and effectively isolated from said first supply means and responsive to the normal load current or voltage developed therein in response to said periodic potential for deriving and applying a control potential to said other output electrode to establish a potential difference between said other output electrode and said intermediate electrode, said second supply means being effective to establish the major portion of said potential difference but, in the absence of said normal load current or potential therein, said control potential and potential difference change to such values that the space-current flow in said device is materially reduced.

2. A periodic-wave generator comprising: a load circuit including means for coupling an inductor thereto and constituting with that inductor, when operatively coupled thereto, primarily inductance; an electron-discharge device having control electrode-cathode input electrodes, anode-cathode output electrodes effectively coupled across said load circuit, and an electrode intermediate said output electrodes; means coupled to said input electrodes for applying thereto a periodic potential to develop a current of saw-tooth wave form in the inductor when it is coupled to said load circuit; a first space-current supply means connected to said anode for applying a predetermined potential thereto; and a potential-supply system including at least a second space-current supply means conductively connected to said intermediate electrode and to said cathode and effectively isolated from said first supply means and responsive to the normal load current or voltage developed therein in response to said periodic potential for deriving and applying a control potential to said cathode to establish a potential difference between said cathode and said intermediate electrode, said second supply means being effective to establish the major portion of said potential difference but, in the absence of said normal load current or potential therein, said control potential and potential difference change to such values that the space-current flow in said device is materially reduced.

3. A periodic-wave generator comprising: a load circuit including means for coupling an inductor thereto and constituting with that inductor, when operatively coupled thereto, primarily inductance; an electron tube having control electrode-cathode input electrodes, anode-cathode output electrodes effectively coupled across said load circuit; means coupled to said input electrodes for applying thereto a periodic potential to develop a current of saw-tooth wave form in the inductor when it is coupled to said load circuit; a first space-current supply means connected to said anode electrode for applying a predetermined potential thereto; and a potential-supply system including at least a second space-current supply means responsive to the normal load current or voltage developed therein in response to said periodic potential and comprising a rectifier device effectively isolated from said first supply means and connected to a predetermined pair of said electrodes, exclusive of said anode electrode, that respond to an applied control potential of a polarity causing an increase in anode-cathode current of said tube for deriving and applying said control potential to said predetermined electrodes to establish the entire potential difference between said predetermined electrodes but, in the absence of said normal load current or potential, said control potential and potential difference change to such values that the space-current flow in said tube is materially reduced.

4. A periodic-wave generator comprising: a load circuit including means for coupling an inductor thereto and constituting with that inductor, when operatively coupled thereto, primarily inductance; a tetrode electron tube having input electrodes, output electrodes effectively coupled across said load circuit, and a screen electrode; means coupled to said input electrodes for applying thereto a periodic potential to develop a current of saw-tooth wave form in the inductor when it is coupled to said load circuit; a first space-current supply means connected to one of said output electrodes for applying a predetermined potential thereto; and a potential-supply system including at least a second space-current supply means conductively connected to said screen electrode and to another of said output electrodes and effectively isolated from said first supply means and responsive to the normal load current or voltage developed therein in response to said periodic potential for deriving and applying a control potential to said other output electrode to establish a potential difference between said other output electrode and said screen electrode, said second supply means being effective to establish the major portion of said potential difference but, in the absence of said normal load current or potential therein, said control potential and potential difference change to such values that the space-current flow in said tube is materially reduced.

5. A periodic-wave generator comprising: a load circuit including a cathode-ray tube beam-deflecting coil and constituting therewith primarily inductance; an electron discharge device having input electrodes, output electrodes effectively coupled across said load circuit, and an electrode intermediate said output electrodes; means coupled to said input electrodes for applying thereto a periodic potential to develop a current of saw-tooth wave form in said coil; a first space-current supply means connected to one of said output electrodes for applying a predetermined potential thereto; and a potential-supply system including at least a second space-current supply means conductively connected to said intermediate electrode and to another of said output electrodes and effectively isolated from said first supply means and responsive to the normal load current or voltage developed therein in response to said periodic potential for deriving and applying a control potential to said other output electrode to establish a potential difference between said other output electrode and said intermediate electrode, said second supply means being effective to establish the major portion of said potential difference but, in the absence of said normal load current or potential therein, said control potential and potential difference change to such values that the space-current flow in said device is materially reduced.

6. A periodic-wave generator comprising: a load circuit including means for coupling an inductor thereto and constituting with that inductor, when operatively coupled thereto, primarily inductance; an electron-discharge device having input electrodes, output electrodes effectively coupled across said load circuit, and an electrode intermediate said output electrodes; means coupled to said input electrodes for applying thereto a periodic potential to develop a current of saw-tooth wave form in the inductor when it is coupled to said load circuit; a first space-current supply means connected to one of said output electrodes for applying a predetermined potential thereto; and a second space-current supply means comprising a rectifier device conductively connected to said intermediate electrode and to another of said output electrodes and effectively isolated from said first supply means and responsive to the normal load current or voltage developed therein in response to said periodic potential for deriving and applying a control potential to said other output electrode to establish a potential difference between said other output electrode and said intermediate electrode, said second supply means being effective to establish said entire potential difference but, in the absence of said normal load current or potential therein, said control potential and potential difference change to such values that the space-current flow in said device is materially reduced.

7. A periodic-wave generator comprising: a load circuit including a transformer having primary and secondary windings and including an inductor coupled across said secondary winding, said load circuit constituting primarily inductance; an electron-discharge device having input electrodes, output electrodes connected across said primary winding and effectively coupled across said load circuit, and an electrode intermediate said output electrodes; means coupled to said input electrodes for applying thereto a periodic potential to develop a current of saw-tooth wave form in said inductor; a first space-current supply means connected through said primary winding to one of said output electrodes for applying a predetermined potential thereto; and a potential-supply system, including at least a second space-current supply means comprising a rectifier device connected in circuit with said secondary winding and said inductor conductively connected to said intermediate electrode and to another of said output electrodes and effectively isolated from said first supply means and responsive to the normal load current or voltage developed therein in response to said periodic potential for deriving and applying a control potential to said other output electrode to establish a potential difference between said other output electrode and said intermediate electrode, said second supply means being effective to establish the major portion of said potential difference but, in the absence of said normal load current or potential therein, said control potential and potential difference change to such values that the space-current flow in said device is materially reduced.

8. A periodic-wave generator comprising: a load circuit including means for coupling an inductor thereto and constituting with that inductor, when operatively coupled thereto, primarily inductance; an electron-discharge device having input electrodes, output electrodes effectively coupled across said load circuit, and an electrode intermediate said output electrodes; means coupled to said input electrodes for applying thereto a periodic potential to develop a current of saw-tooth wave form in the inductor when it is coupled to said load circuit; a first space-current supply means connected to one of said output electrodes for applying a predetermined potential thereto; and a potential-supply system including at least a second space-current supply means resonant at a frequency approximately five times that of said current of saw-tooth wave form responsive to the normal load current or voltage developed therein in response to said periodic potential for deriving and applying a control potential to another of said output electrodes and for establishing a potential difference between said other output electrode and said intermediate electrode, the parameters of said system being so arranged and proportioned that the major portion of said potential difference is established by said second supply means and that, in the absence of said normal load current or potential, said control potential and potential difference change to such values that the space-current flow in said device is materially reduced.

9. A periodic-wave generator comprising: a load circuit including an inductor and constituting therewith inductance; an electron-discharge device having input electrodes, output electrodes effectively coupled across said load circuit, and an electrode intermediate said output electrodes; means coupled to said input electrodes for applying thereto a periodic potential to develop a current of saw-tooth wave form having relatively long trace intervals and short retrace intervals in said inductor; a first space-current supply means connected to one of said output electrodes for applying a predetermined potential thereto; and a potential-supply system including at least a second space-current supply means resonant at a frequency approximately five times that of said current of saw-tooth wave form and comprising a diode for usefully discharging the energy stored in said inductor at the start of said trace intervals and responsive to the normal load current or voltage developed therein in response to said periodic potential for deriving and applying a control potential to another of said output electrodes and for establishing a potential difference between said other output electrode and said intermediate electrode, the parameters of said system being so arranged and proportioned that the major portion of said potential difference is established by said second supply means and that, in the absence of said normal load current or potential, said control potential and potential difference change to such values that the space-current flow in said device is materially reduced.

10. A periodic-wave generator comprising: a load circuit including means for coupling an inductor thereto and constituting with that inductor, when operatively coupled thereto, primarily inductance; an electron-discharge device having input electrodes, output electrodes effectively coupled across said load circuit, and an electrode intermediate said output electrodes; means coupled to said input electrodes for applying thereto a periodic potential to develop a current of saw-tooth wave form in the inductor when it is coupled to said load circuit; a first space-current supply means connected to one of said output electrodes for applying a predetermined potential thereto; and a potential-supply system including at least a second space-current supply means conductively connected to said intermediate electrode and to another of said output electrodes and responsive to the normal load current or voltage developed therein in response to said periodic potential for deriving and applying a control potential to said other output electrode to establish a potential difference between said other output electrode and said intermediate electrode, said second supply means being effective to establish at least 80 per cent of said potential difference but, in the absence of said normal load current or potential therein, said control potential and potential difference change to such values that the space-current flow in said device is materially reduced.

11. A periodic-wave generator comprising: a load circuit including means for coupling an inductor thereto and constituting with that inductor when operatively coupled thereto primarily inductance; an electron-discharge device having control electrode-cathode input electrodes, anode-cathode output electrodes effectively coupled across said load circuit and an electrode intermediate said output electrodes, said intermediate electrode being directly connected to ground; means coupled to said input electrodes for applying thereto a periodic potential to develop a current of saw-tooth wave form in the inductor when it is coupled to said load circuit; a first space-current supply means connected to said anode for applying a predetermined potential thereto which is positive with respect to ground; a second space-current supply means including a rectifier device connected in circuit with said load circuit and responsive to the normal load current or voltage developed therein in response to said periodic potential for deriving a control potential which is negative with respect to ground; and a control circuit coupled between said second supply means and said cathode for applying said control potential to said cathode effectively to bias said intermediate electrode in a positive sense with reference to said cathode; said second supply means, in the absence of said normal load current or potential in said load circuit, being effective to cause said control potential and said positive bias to diminish to such a small value that the space-current flow in said device is materially reduced.

12. A periodic-wave generator comprising: a load circuit including an inductor and constituting therewith primarily inductance and including a diode rectifier for deriving a high unidirectional potential from the flow of rectified current therethrough, said high unidirectional potential being undesirably subject to variations with changes in said rectified current; an electron-discharge device having input electrodes, output electrodes effectively coupled across said load circuit, and an electrode intermediate said output electrodes; means coupled to said input electrodes for applying thereto a periodic potential to develop a current of saw-tooth wave form in said inductor; a first space-current supply means connected to one of said output electrodes for applying a predetermined potential thereto; a second space-current supply means including a rectifier device connected in circuit with said load circuit and responsive to the normal load current or voltage developed therein in response to said periodic potential for deriving a control potential; a control circuit coupled between said second space-current supply means and another of said output electrodes for applying said control potential to said other output electrode effectively to bias said intermediate electrode in a predetermined sense with reference to said other output electrode; said second space-current supply means, in the absence of said normal load current or potential in said load circuit, being effective to cause said control potential and said bias to change to such a value that the space-current flow in said electron-discharge device is materially reduced; and a source of unidirectional potential having a value which is much smaller than that of said control potential effectively coupled between said other electrode and said intermediate electrode for reducing the extent of said unidirectional potential variations.

RINALDO E. DE COLA.

References Cited in the file of this patent

UNITED STATES PATENTS

| Number | Name | Date |
|---|---|---|
| 2,474,474 | Friend | June 28, 1949 |